(12) United States Patent
Darois et al.

(10) Patent No.: US 8,794,973 B2
(45) Date of Patent: Aug. 5, 2014

(54) CONTAMINATION DETECTION SIMULATION SYSTEMS AND METHODS

(75) Inventors: Eric L. Darois, New Market, NH (US); Frederick P. Straccia, Stratham, NH (US); James P. Tarzia, East Hampstead, NH (US)

(73) Assignee: Radiation Safety and Control Services, Inc., Stratham, NH (US)

( * ) Notice: Subject to any disclaimer, the term of this patent is extended or adjusted under 35 U.S.C. 154(b) by 1200 days.

(21) Appl. No.: 12/426,099

(22) Filed: Apr. 17, 2009

(65) Prior Publication Data

US 2009/0263771 A1    Oct. 22, 2009

Related U.S. Application Data

(60) Provisional application No. 61/045,861, filed on Apr. 17, 2008.

(51) Int. Cl.
*G09B 9/00* (2006.01)
*G09B 23/20* (2006.01)

(52) U.S. Cl.
CPC . *G09B 9/00* (2013.01); *G09B 23/20* (2013.01)

USPC .......................................................... 434/218

(58) Field of Classification Search
USPC .......................................................... 434/218
See application file for complete search history.

(56) References Cited

U.S. PATENT DOCUMENTS

| 5,077,685 | A | * | 12/1991 | Iwashima et al. | 703/18 |
| 5,304,065 | A | * | 4/1994 | Hurst et al. | 434/218 |
| 5,807,113 | A | * | 9/1998 | Groeber | 434/218 |
| 6,033,225 | A | * | 3/2000 | Pike | 434/218 |
| 8,374,832 | B1 | * | 2/2013 | Kletecka et al. | 703/6 |

* cited by examiner

*Primary Examiner* — Nikolai A Gishnock
*Assistant Examiner* — Banafsheh Hadizonooz
(74) *Attorney, Agent, or Firm* — Onello & Mello, LLP

(57) ABSTRACT

Provided are contamination detection simulation systems and methods comprising a control unit that generates a first signal comprising data corresponding to a simulated source of contamination; a simulated detector that receives the signal from the control unit, the simulated detector positioned at a distance from a surface; a proximity detector that determines the distance between the simulated detector and the surface and outputs a distance result; and a processing unit that generates a second signal in response to the first signal and the distance result.

22 Claims, 5 Drawing Sheets

CONTAMINATION DETECTION SIMULATION SYSTEMS AND METHODS

RELATED APPLICATIONS

This application claims the benefit of U.S. Provisional Patent Application No. 61/045,861, filed Apr. 17, 2008, the content of which is incorporated herein by reference in its entirety.

FIELD OF THE INVENTION

The present invention relates to devices and methods that improve the simulation of contamination detectors.

BACKGROUND

There is an ongoing need to address public safety concerns regarding the accidental, intentional, or natural release of contaminants from potentially hazardous materials, for example, radiation, chemicals, poisons, biological agents, and the like. While sophisticated sensing devices are available to detect such contaminants, it is important that the operators of these devices be properly trained in the use of the devices, without exposing the operators to possible contamination during operational training of these devices. Therefore, it is preferable that an operator be trained in a non-hazardous environment that simulates the detection of the contaminants, but that the operator not be exposed to potentially hazardous radioactive, chemical, or biological contamination.

Conventional hazardous material detection simulation systems often include a simulated detector, such as a training probe, that receives hanuless signals, for example, radiofrequency (RF) signals or signals emitted from harmless substances, such as magnets or metallic substances, that simulate gases, vapors, or radiation from a contaminated surface. The simulated detector measures the received signals from the source and outputs the signals to a meter display, wherein the meter readings are studied by an operator trainee under the supervision of an instructor.

Other conventional training systems can include a control unit instead of a live source, which transmits a signal to a simulated detector, which responds to the signal as if it was detecting an actual source of contamination. The signal provided by the control unit includes data that simulates a dose rate or contamination level that is controlled by a control unit operator or instructor. This data is transmitted by the control unit to the simulated detector, and also to a meter, where an operator trainee takes readings of measurements.

The ability of these training systems to simulate a realistic response of the simulated detector to surface contamination depends largely on the skills of the control unit operator, since the operator needs to continually monitor the location of the simulated detector relative to a surface over which the detector is positioned, and needs to manually change the contamination level on the control unit to account for changes in its proximity to the surface. Thus, if the distance between the detector and the surface changes, and if the operator does not adjust the control unit signal to accommodate for the change in distance, the meter may not display accurate readings, since, in "real life" environments, the contamination level may be different depending on the distance to the surface. Further, it is difficult to train the operator trainee to position a detector at a proper orientation and distance from the surface when performing a survey of the surface. Accordingly, the simulation may not be realistic to the operator trainee, which may affect the quality of the training received by the operator trainee.

SUMMARY OF INVENTION

In accordance with aspects of the invention, a detection simulation system comprises a control unit that generates a first signal comprising data corresponding to a simulated source of contamination; a simulated detector that receives the signal from the control unit, the simulated detector positioned at a distance from a surface; a proximity detector that determines the distance between the simulated detector and the surface and outputs a distance result; and a processing unit that generates a second signal in response to the first signal and the distance result.

In an embodiment, the simulated source of contamination comprises simulated alpha or beta radioactive particles, chemical or biological contamination.

In an embodiment, the first signal comprises data that simulates a response to a dose rate or contamination level of the source of contamination when the simulated detector is in contact with a surface.

In an embodiment, the processing unit modifies the data of the first signal based on the distance result.

In an embodiment the second signal comprises data that simulates a dose rate or contamination level of the source of contamination adjusted according to the distance result.

In an embodiment, the simulated dose rate or contamination level simulates a maximum dose rate or contamination level at a contaminated surface, and wherein the processing unit generates the second signal that simulates a response to an adjusted dose rate or contamination level based on the distance result.

In an embodiment, the system comprises a meter that receives the second signal from the processing unit. In an embodiment, the meter, in response to the second signal, simulates a response to alpha or beta radioactive particles.

In an embodiment, the simulated detector comprises a training probe, wherein the proximity detector is configured to be positioned in the training probe.

In an embodiment, the proximity detector provides a signal to the processing unit indicating whether the simulated detector is properly positioned over the surface.

In an embodiment, the proximity detector comprises a transducer that determines the distance between the simulated detector and the surface.

In an embodiment, the second signal is received by the control unit.

In accordance with other aspects of the invention, a method of simulating detection of a source of material comprises generating a first signal comprising data corresponding to a simulated source of contamination; positioning a simulated detector at a distance from a surface; determining the distance between the simulated detector and the surface; and generating a second signal in response to the first signal and the distance result.

In an embodiment, the method further comprises verifying that the detector is properly positioned at a same distance between the simulated detector and the surface during a period of time.

In an embodiment, the simulated source of contamination comprises simulated alpha or beta radioactive particles.

In an embodiment, generating the first signal comprises generating data that simulates a response to a dose rate or contamination level of the source of contamination when the simulated detector is in contact with a surface.

In an embodiment, generating the second signal comprises generating data that simulates a response to a dose rate or contamination level of the source of contamination adjusted according to the distance result.

In an embodiment, the simulated dose rate or contamination level simulates a maximum dose rate or contamination level at a contaminated surface, and wherein the processing unit generates the second signal that simulates a response to an adjusted dose rate or contamination level based on the distance result.

In an embodiment, the method comprises determining whether the simulated detector is properly positioned over the surface.

In accordance with other aspects of the invention, a method of training an operator to detect contamination in a hazardous environment comprises setting at least one simulated measurement of the detected contamination on a control unit; transmitting the at least one simulated measurement to a simulated detector; measuring a distance between the simulated detector and a surface over which the simulated detector is positioned; modifying the at least one simulated measurement in response to the distance between the simulated detector and the surface; and outputting the at least one modified simulation measurement to a display.

In an embodiment, the at least one simulated measurement comprises at least one of a simulated dose rate and a contamination level of at least one of alpha radiation and beta radiation.

In an embodiment, the display is at least one of a display of the control unit and a meter display.

In an embodiment, an instructor sets the at least one simulated measurement on the control unit and wherein the trainee has an instrument that receives the modified simulated measurement.

BRIEF DESCRIPTION OF THE DRAWINGS

The present invention will become more apparent in view of the attached drawings and accompanying detailed description. The embodiments depicted herein are provided by way of example, not by way of limitation, wherein like reference numerals refer to the same or similar elements throughout the different views. The drawings are not necessarily to scale, emphasis instead being placed upon illustrating aspects of the invention. In the drawings.

DETAILED DESCRIPTION OF EMBODIMENTS

Figure 1:
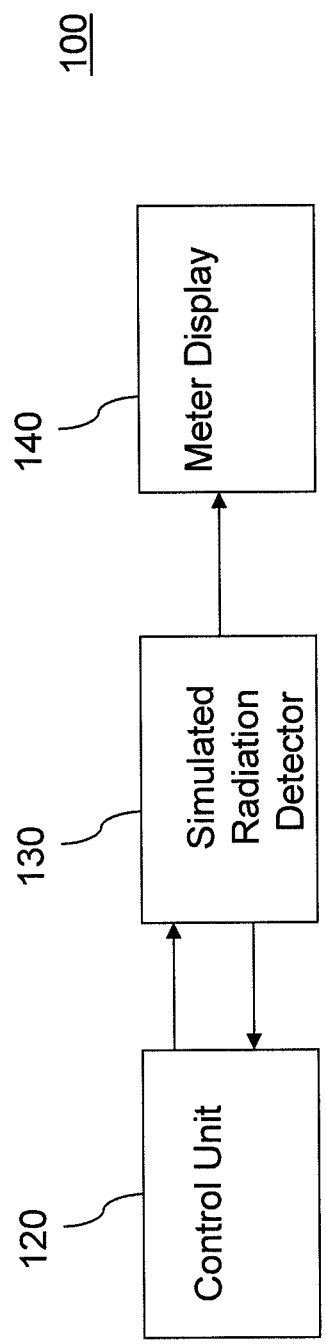
FIG. 1 is a block diagram of a conventional radiation detection simulation system that simulates a radiation detector.

Hereinafter, aspects of the present invention will be described by describing illustrative embodiments in accordance therewith, with reference to the attached drawings. While describing these embodiments, detailed descriptions of well-known items, functions, or configurations are typically omitted for conciseness.

It will be understood that, although the terms first, second, etc. are be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

Unless otherwise specified, the illustrated embodiments can be understood as providing exemplary features of varying detail of certain embodiments, and therefore, unless otherwise specified, features, components, modules, and/or aspects of the illustrations can be otherwise combined, separated, interchanged, and/or rearranged without departing from the disclosed systems or methods. Additionally, the shapes and sizes of components are also exemplary and unless specified, can be altered without affecting the scope of the disclosed and systems or methods of the present disclosure.

It will be understood that when an element is referred to as being "on" or "connected" or "coupled" to another element, it can be directly on or connected or coupled to the other element, or intervening elements can be present. In contrast, when an element is referred to as being "directly on" or "directly connected" or "directly coupled" to another element, there are no intervening elements present. Other words used to describe the relationship between elements should be interpreted in a like fashion, e.g., "between" versus "directly between," "adjacent" versus "directly adjacent," "in contact with" versus "in direct contact with" etc. It will be further understood that when an element is referred to as being "in contact with" another element, the element can be directly abutting the other element such that there is no separation between the two elements, or the element can be separated from the other element by a small distance.

To address the abovementioned limitations of the prior art, in embodiments, systems and methods are provided that simulate a contaminant detector, for example, a radiation detector, and in doing so, consider a distance between the simulated detector and a surface by utilizing a proximity detector that modifies a simulated dose rate measurement, contamination level measurement, or other data known to those of ordinary skill in the art as being useful in detecting contaminants, such as radioactive, chemical or biological agents, and the like. Accordingly, the systems and methods described herein are useful for exercising basic detection principles, for example, radiation or chemical detection principles, as well as safety concepts.

FIG. 1 is a block diagram of a conventional radiation detection simulation system 100 that simulates a radiation detector. The training system 100 comprises a control system 120, a simulated radiation detector 130, and a meter 140.

The control unit 120 allows an operator or instructor to select a signal strength that represents a simulated dose rate or contamination level of a source of radiation and to transmit a signal representing a response to the simulated dose rate or contamination level to the simulated radiation detector 130 via a radio or wireless link, direct connection, internet connection, or other communication method known to those of ordinary skill in the art. The simulated radiation detector 130 in turn outputs the signal to a visual display or audio device on the meter 140. During operational training, an operator trainee can observe readings, perform calculations, etc. based on results displayed on the meter.

However, the conventional radiation detection simulation system 100 shown in FIG. 1 may not provide an operator trainee with a "real-life experience," since the control unit operator must change the signal provided to the display in order to compensate for changes in position of the detector 130 relative to the simulated contaminated surface. For example, in a real-life operation, a detector that is positioned 3 inches from a surface of a sample emitting beta radiation particles may receive a signal at 3 inches, but receive a different signal if the detector is positioned 4 inches from the surface. The training system 100, on the other hand, cannot automatically adjust the simulated signal when an operator/trainee moves the detector from 3 inches to 4 inches from the surface. Instead, the control unit operator must change the simulated signal on the control unit 120 in order to compensate for this change in position of the simulated detector 130. Thus, the control unit operator must continually monitor the location of the simulated radiation detector 130 relative to the surface, and manually change the signal on the control unit 120, in order to account for changes in distance relative to the surface. In addition, there is no way to verify that the operator trainee is properly positioning the active face of the detector toward the sample. Further, there is no way to verify that the operator trainee is moving the detector along the surface at a constant distance from the surface, which is necessary during certain operations, for example, in performing a survey of an area containing hazardous material.

Figure 2:
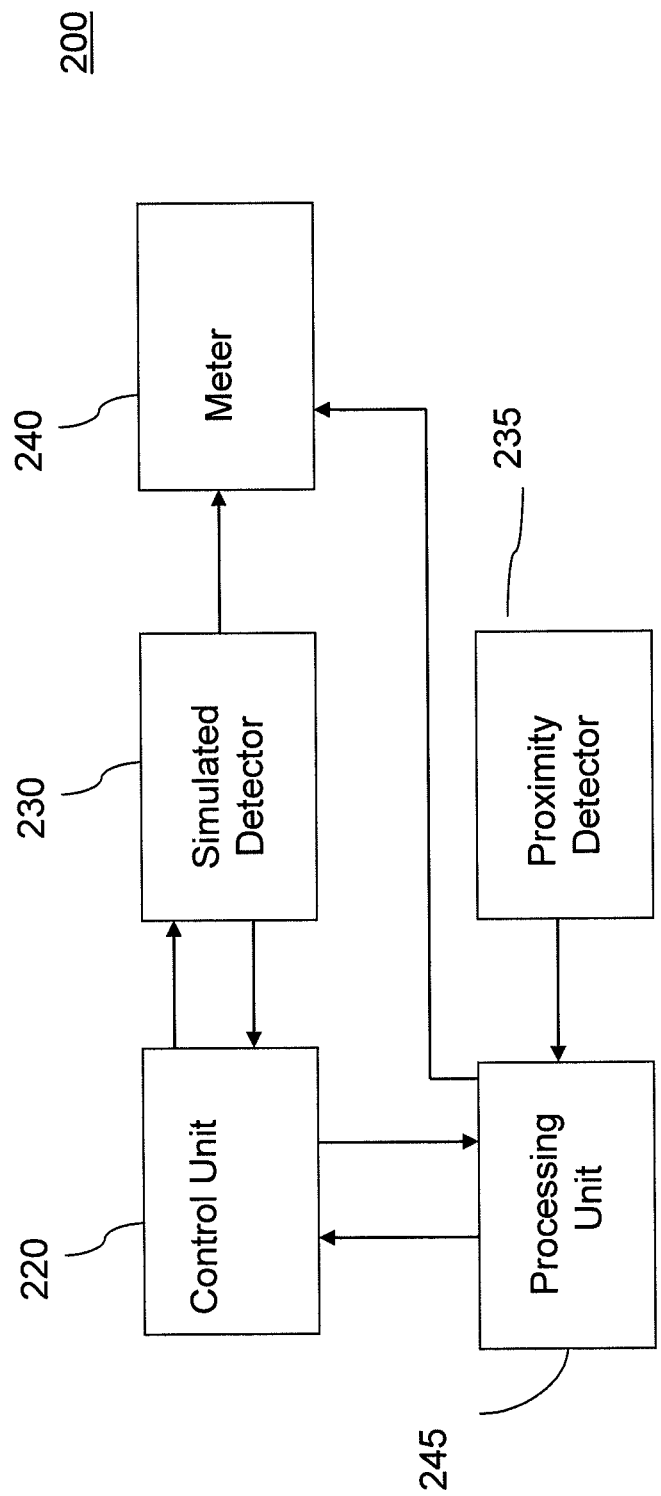
FIG. 2 is a block diagram of a contaminant detection simulation system, according to embodiments of the invention.

FIG. 2 is a block diagram of a contaminant detection simulation system 200 according to embodiments of the invention. In an embodiment, the detection simulation system 200 automatically emulates the response of a radiation detector to alpha or beta particle contamination. In other embodiments, the detection simulation system can emulate the response of other detectors that detect hazardous and non-hazardous matter and energy waves produced by chemicals, biological agents, gases, residues, contamination, vapors, fumes, or other hazardous or non-hazardous particles.

The detection simulation system 200 comprises a control unit 220, a simulated detector 230, also referred to herein as a signal detector, a proximity detector 235, a processing unit 245, and a meter 240.

The control unit 220 outputs a signal representing a response to a simulated or hypothetical dose rate or contamination level, or outputs signals representing other data known to those of ordinary skill in the art as being useful in the detection of a source of material, such as radioactive material, chemicals, biological agents, and the like. For example, the signal can simulate a contamination level of alpha radiation contamination or beta radiation contamination, or simulate a contamination level of a chemical or biological agent, or simulate a response to the abovementioned contamination levels. In an embodiment, the strength or level of the simulated source of material is selected by a human operator. In another embodiment, the strength of the simulated source of material is computer-generated, for example, a radiation pattern that is provided by a software program stored on a computer.

In an embodiment, the control unit 220 outputs a first signal that simulates a response to a maximum dose rate or contamination level. In an embodiment, the simulated maximum dose rate or contamination level applies to a dose rate or level of contamination directly on a contaminated surface. In an embodiment, the control unit 220 can receive a second signal from other elements of the system 200, such as at least one of the detector 230 and the processing unit 245. One such second signal includes data corresponding to a dose rate or contamination level adjusted for distance between the detector 230 and the surface.

In an embodiment, the control unit 220 is co-located with the simulated detector 230, for example, enclosed together in a single platform. In an embodiment, the control unit 220 comprises the processing unit 245, described below. In other embodiments, the control unit 220 is directly or indirectly connected to the simulated detector 230. In another embodiment, the control unit 220 communicates with the simulated detector 230 by a radio link, GPS, or other wireless communication link, or interne connection. The simulated detector 230 receives the signal from the control unit 220 and upon receipt of the signal responds to the signal as if it was detecting actual contamination, such as alpha or beta radiation, vapors, chemicals, biological agents, and the like. The simulated detector 230 outputs the signal to the meter 240, which reports the signal on a display of the meter. In an embodiment, the display is a visual display. In other embodiments, the meter 240 can include an audio and/or visual device that outputs the signal as tones, clicks, human speech, or sounds that a trained operator can comprehend. In an embodiment, the meter 240 can be an off-the-shelf meter, and include features known to those of ordinary skill in the art. In an embodiment, the meter 240 can be part of the detector 230. In an embodiment, the meter 240 can be a commercial off-the-shelf meter that can be configured to operate in response to signals received from the detector 230 and/or the control unit 220, or can operate with sensing devices such as probes that detect actual hazardous materials. For example, the meter 240, in response to signals received from the control unit 220 and/or the proximity detector 235, can be responsive to simulated alpha or beta radioactive particles or alternatively, and can provide readings corresponding to actual alpha or beta radioactive particles when the detector 230 is not in communication with the meter 240.

In an embodiment, the simulated detector 230 receives additional data that is used to adjust the received signal in response to the data, wherein the adjusted signal is output to at least one of the control unit 220 and the meter 240. In an embodiment, the additional data includes detector-to-surface distance information provided by the proximity detector 235.

In an embodiment, the simulated detector 230 is configured to operate substantially the same as an actual contaminant detector. Unlike conventional simulated detectors, the simulated detector 230 in the embodiments herein can verify if an operator trainee is holding a face of the detector, or a probe of the detector, at a proper orientation and at a proper distance from a surface simulating a contaminated surface in order to perform a survey of contamination on the surface. In addition, the simulated detector 230 in the embodiments herein can verify if an operator trainee is holding the detector at an optimum distance from a surface while attempting to locate surface contamination, noting that the instructor can determine whether the operator trainee has in fact located surface contamination by sending a signal from the control unit 220 to the probe. These features are achieved by the proximity detector 235, which continuously provides distance-to-surface data to the processing unit 245 or the control unit 220 for the instructor to use to verify an ideal, consistent distance while the operator trainee is performing a task, such as a survey of the surface.

The proximity detector 235 transmits data related to distance from the surface simulating a contaminated surface. In an embodiment, the proximity detector 235 comprises at least one transducer comprising a transceiver that measures a distance from the surface to back-calculate the signal corresponding to the simulated or hypothetical dose rate sent to the meter display based on a maximum dose rate at contact. In other embodiments, one or more sensors can be used to measure the detector-to-surface distance. In an embodiment, the proximity detector 235 determines a distance from the simulated detector 230 to the surface and provides the detector-to-surface distance result to the processing unit 245 to the simulated detector 230. In an embodiment, the proximity detector 235 comprises at least one piezoelectric sensor that operates at frequencies known to those of ordinary skill in the art, for example, ultrasonic frequencies. In an embodiment, the at least one piezoelectric sensor can comprises a single piezoelectric transducer. In other embodiment, the at least one piezoelectric transducer can include a first transducer comprising a transmitter that transmits signals to the surface, and a second transducer comprising a receiver that receives signals from the surface.

In an embodiment, the proximity detector 235 comprises a wireless sensing system, such as a laser sensing system or acoustic sensing system such as an ultrasonic sensing system that determines the distance between the proximity detector 235 and the surface by operating at frequency ranges known to those of ordinary skill in the art. The distance between the detector 230 and the surface is determined by outputting from the sensing system a first signal to the surface. The proximity detector 235 receives a second signal from the surface in response to the outputted first signal, and calculates the time required for the second signal to be reflected back to the sensor from the surface. In an embodiment, at least one of the first signal and second signal operates at laser frequencies. In another embodiment, at least one of the first signal and second signal operates at ultrasonic frequencies. The calculated time is converted into a distance result, which is output to the processing unit 245.

The proximity detector 235 can determine if the distance between the detector 230 and the surface is greater than or equal to 0 inches. As described above, the control unit 220 generates a signal based on measurements taken when the detector 230 is positioned on or in contact with the surface, or when the detector 230 is proximal to or near the surface, for example, 0-1 inches from the surface. If the proximity detector 235 determines that the distance between the detector 230 and the surface is greater than 0 inches in one embodiment, or greater than 0-1 inches in another embodiment, data including the actual distance between the detector 230 and the surface is provided to the processing unit 245, wherein the signal provided by the control unit is adjusted in response to the distance result provided by the proximity detector 235, and the adjusted signal is output to at least one of the control unit 220 and the meter 240.

The processing unit 245 receives the signal from the control unit 220 and the detector-to-surface distance data from the proximity detector 235 and in response generates an adjusted signal that is output to at least one of the control unit 220 and the meter 240. For example, the initial signal output by the control unit 220 to the simulated detector 230 can represent a maximum dose rate, contamination level, or other measurements of a simulated source at a distance that is, in an embodiment, 0 inches from the surface, or another embodiment, is 0-1 inches from the surface, and is automatically modified by the detector-to-surface result to accurately represent a dose rate, contamination level, or other measurements of a simulated source adjusted based on the calculated distance between the detector and the source.

In an embodiment, as shown in FIG. 2, the processing unit 245 is separate from the simulated detector 230, wherein the detector 230 simulates a detector, and the processing unit 245 performs the calculation. In another embodiment, the processing unit 245 is part of the detector 230. In an embodiment, the processing unit 245 is part of the control unit 220.

In an embodiment, the processing unit 245 recalculates the dose rate or contamination level provided by the control unit 220 based on the distance of the detector 230 from the surface. The processor can calculate the change in dose rate or contamination level by applying empirical relationships or theoretical principles associated with changes in distance and/or geometry, for example, orientation, angular position, or attitude of the detector relative to a hypothetical or simulated contaminated surface. The empirical relationships or theoretical principles applied are based on the performance characteristics of a non-simulated detector relative to a non-simulated contaminate. More specifically, different contaminates, for example, alpha and beta radiation, can have different empirical relationships, or theoretical principles, and upon selection of the contaminate via the control unit 220, the processing unit 245 can recalculate the dose or contamination level using the corresponding distance and/or geometry factors associated to the contaminate.

The system 200 outputs the data, for example, corresponding to the modified dose rate, or contamination level, to at least one of the meter 240 and the control unit 220. In an embodiment, the control unit 220 and simulated detector 230 continually transmit the signals described herein in real-time. The meter 240 and control unit 220 continually update the reported data in real time to emulate the effects of moving the simulated detector 230 closer to or farther from the simulated surface contamination.

Figure 3:
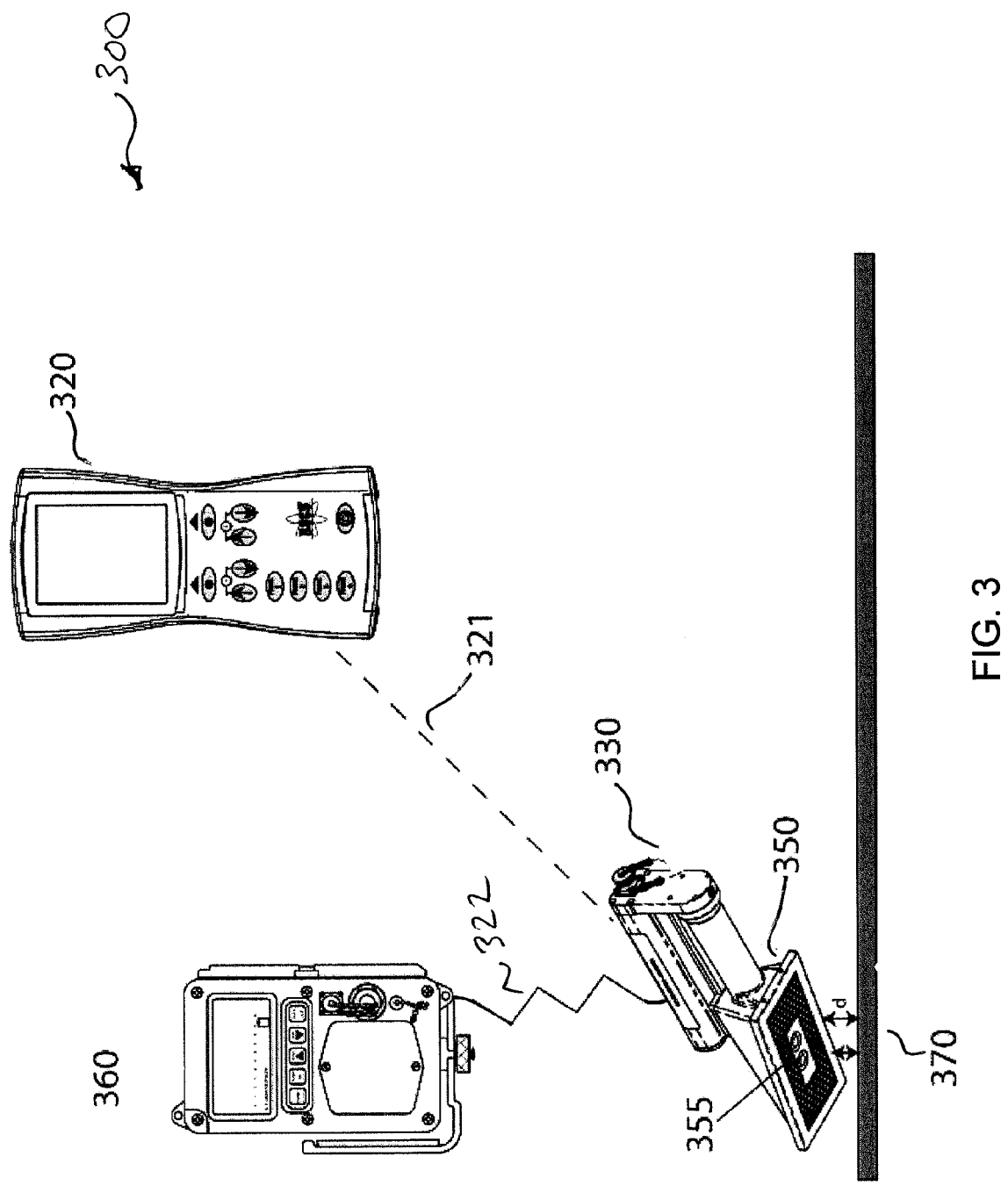
FIG. 3 is a diagram illustrating a contaminant detection simulation system including a training detector and a meter, according to embodiments of the invention.
Figure 4:
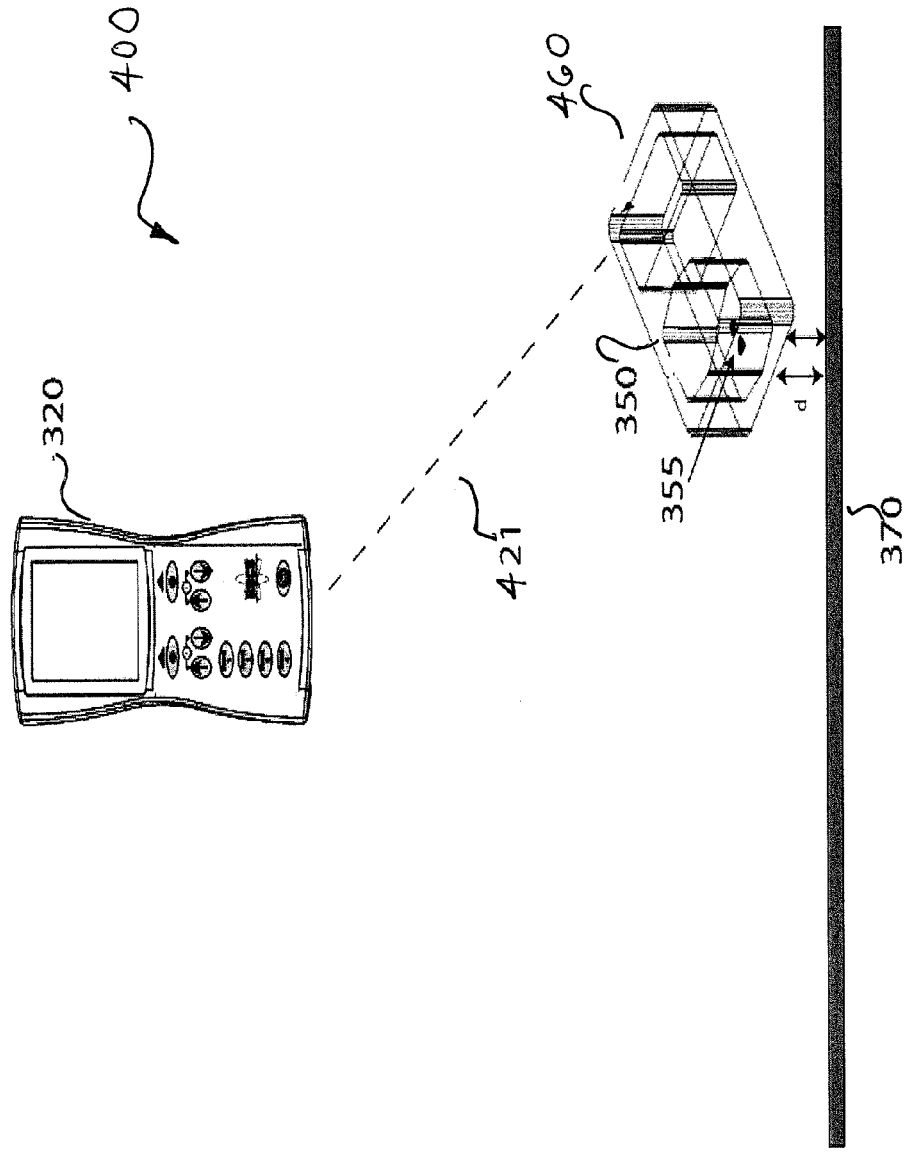
FIG. 4 is a diagram illustrating a contaminant detection simulation system including a training detector and a simulated meter, according to embodiments of the invention.

FIG. 3 is a diagram illustrating a contaminant detection simulation system 300 including a simulated monitoring detector 350 and a meter 360, according to embodiments of the invention. FIG. 4 is a diagram illustrating a contaminant detection simulation system 400 including a simulated monitoring detector 350 and a simulated meter 460, according to embodiments of the invention.

In FIGS. 3 and 4, a control unit 320 is controlled by an operator, for example, a training instructor, who can output a signal via a communication path 321, 421, respectively, to a training detector such as a simulated monitoring detector 350 that simulates results of a dose rate, contamination level, or other measurements known to those of ordinary skill in the art of a source of material. In FIG. 3, the signal can also be output to a meter 360 that can also measure "real" contamination, also referred to as a "'real' meter". In FIG. 4, the signal can be output to a simulated meter 460, which includes the simulated monitoring detector 350. In an embodiment, the communication paths 321, 421 can be direct connections, for example, a wire or cable between the control unit 320 and the simulated monitoring detector 350. In other embodiments, the communication paths 321, 421 can be wireless connections.

In the embodiment shown in FIG. 3, the simulated monitoring detector 350 can be positioned in a simulated monitoring probe 330 that is attached via a direct or wireless connector 322 to a "real" meter 360. In an embodiment, the meter 360 can be a commercial off-the-shelf meter that can be configured to operate in response to signals received from the detector 350 and/or the control unit 320, or can operate with sensing devices such as a monitoring probe that detects actual hazardous materials. In the embodiment shown in FIG. 4, a detector 350 is positioned in the simulated meter 460. In other embodiments, the detector 350 is positioned in a different location than the meter 460.

A conventional monitoring probe can detect radiation, gases, vapors, emissions, and the like, when the probe is placed over a source of the radiation, gases, etc., and generate a signal, for example, an analog signal, from the detected radiation, gases, etc. In FIG. 3, the detector 350 is positioned in a simulated monitoring probe 330, wherein readings are output to the meter 360. In FIGS. 3 and 4, the simulated monitoring detector 350 can be positioned by an operator trainee over a surface 370 and allow the trainee to take readings from the meter 460.

In an embodiment, the simulated monitoring detector 350 comprises a proximity detector 355, which continuously provides to a processing unit data (d) related to the distance to the surface 370. In response to the data (d), the signal provided by the control unit 320 to the simulated detector 330 can be adjusted, and output to the control unit 320 to notify the instructor of the adjusted signal, and can be output to the simulated meter 460 (FIG. 4) or "real" meter 360 (FIG. 3) to permit the operator trainee to take accurate readings. The instructor can also verify a distance and orientation while the operator trainee is performing a task, such as a survey of the surface 370.

Figure 5:
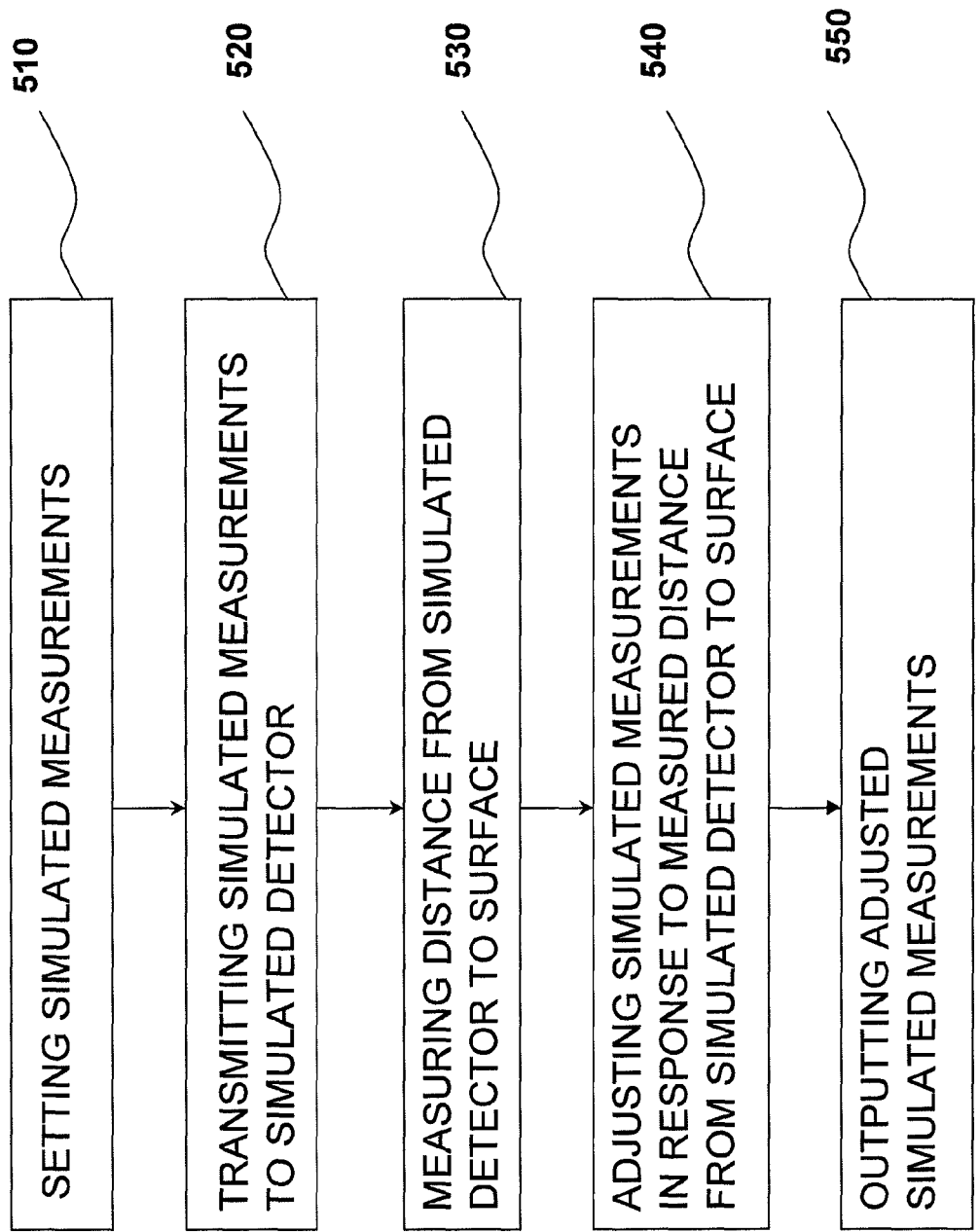
FIG. 5 is a flowchart of the steps used to simulate the detection of contamination on a surface in accordance with an embodiment of the present invention.

FIG. 5 is a flowchart of the steps used to simulate the detection of contamination on a surface in accordance with an embodiment of the present invention.

As shown in Step 510, simulated measurements are set. In an embodiment, the simulated measurements can be set by an operator or instructor on a control unit, such as control unit 220 shown in FIG. 2 or control unit 320 shown in FIGS. 3 and 4. In another embodiment, the simulated measurements can be input to, or determined by, a computer. In an embodiment, the simulated measurements can include a dose rate, contamination level, or other parameters known to those of skill in the art as being determined by a detector and measured by an operator.

As shown in Step 520, the simulated measurements are transmitted to a simulated detector, which responds to the simulated measurements as if it was detecting actual contamination, such as radiation, vapors, chemicals, biological agents, and the like. The simulated detector can output the simulated measurements to a meter, which can be used by an operator trainee to take readings of the measurements.

As shown in Step 530, the distance between the simulated detector and a surface is measured. As shown in Step 540, the simulated measurements are adjusted in response to the measured distance between the simulated detector and the surface. In an embodiment, a processing unit recalculates the simulated measurements based on the transmitted signal from a proximity detector, where calculations are performed to adjust the simulated measurements to more accurately simulate the presence of contamination of the surface.

As shown in Step 550, the adjusted simulated measurements are output. In an embodiment, the adjusted simulated measurements are output to the control unit, wherein an instructor can provide feedback to the operator trainee in response to the adjusted simulated measurements. In another embodiment, the adjusted simulated measurements are output to a meter so that an operator trainee can reposition the detector to be at a proper distance from the simulated contaminated surface in order to receive more appropriate readings.

The systems and methods for simulating contamination detection provide several advantages over conventional training systems. One advantage is that the systems and methods can simulate the detection of beta and alpha particles emitted from a surface containing radioactive contamination in real time and in a realistic manner. A second advantage is that the systems and methods provide an accurate calculation of a simulated dose rate or contamination level response based on a distance from a surface using an established response algorithm, thereby simulating a response based on the presence of contamination on the surface, which is actually a hypothetical contamination level as no actual contamination exists on the surface. This method of emulating the response of a radiation detector to beta or alpha particle surface contamination has wide potential application for radiation detector training simulator systems using various detector technologies. The radiation energy response of different detector technologies could then be used to modify the dose rate or contamination level response algorithm in order to allow the training system to simulate various radiation detector designs.

Accordingly, the systems and methods for simulating contamination detection described herein have wide potential application in many fields where detectors, including radiation detectors, chemical detectors, and the like are used, and where training is required on such detectors, including, but not limited to, environmental cleanup, waste monitoring, and emergency response.

While this invention has been particularly shown and described with references to preferred embodiments thereof, it will be understood to those skilled in the art that various changes in form and details may be made herein without departing from the spirit and scope of the invention as defined in the appended claims.

What is claimed is:

1. A detection simulation system comprising:
   a control unit that generates a first signal comprising data corresponding to a simulated source of surface contamination;
   a simulated detector that receives the first signal from the control unit, the simulated detector positioned at a distance with respect to a surface, and constructed and arranged to survey the entire surface for locating the surface contamination;
   a proximity detector that continuously determines the distance with respect to the surface by outputting distance determination signals towards the surface, and receiving the distance determination signals reflected from the surface, and that generates a distance results in response to the received reflected distance determination signals; and
   a processing unit that generates second signals in response to the first signal and the distance results.

2. The detection simulation system of claim 1, wherein the simulated source of surface contamination comprises simulated hazardous material.

3. The detection simulation system of claim 1, wherein the first signal comprises data that simulates a response to a dose rate or contamination level of the source of surface contamination when the simulated detector is in contact with a surface.

4. The detection simulation system of claim 1, wherein the processing unit modifies the data of the first signal based on the distance results.

5. The detection simulation system of claim 1, wherein the second signal comprises data that simulates a dose rate or contamination level of the source of surface contamination adjusted according to the distance results.

6. The detection simulation system of claim 5, wherein the simulated dose rate or contamination level simulates a maximum dose rate or contamination level at a contaminated surface, and wherein the processing unit generates the second signal that simulates a response to an adjusted dose rate or contamination level based on the distance results.

7. The detection simulation system of claim 1 further comprising a meter that receives the second signal from the processing unit.

8. The detection simulation system of claim 7, wherein the meter, in response to the second signal, simulates a meter response to a hazardous material.

9. The detection simulation system of claim 1, wherein the simulated detector comprises a training probe, wherein the proximity detector is configured to be positioned in the training probe.

10. The detection simulation system of claim 1, wherein the proximity detector provides a signal to the processing unit indicating whether the simulated detector is properly oriented relative to the surface.

11. The detection simulation system of claim 1, wherein the proximity detector comprises a transducer that determines the distance based on the orientation between the simulated detector and the surface.

12. The detection simulation system of claim 1, wherein the second signal is received by the control unit.

13. A method of simulating detection of a source of material comprising:
   generating a first signal corresponding to a simulated source of surface contamination;
   positioning a simulated detector at a distance with respect to a surface;
   determining a distance between the simulated detector and the surface by outputting a distance determination signal towards the surface, while surveying the entire surface for locating the surface contamination;
   receiving the distance determination signal reflected from the surface;
   generating a distance result in response to the received reflected distance determination signal; and
   generating a second signal adjusted for the simulated contamination level or dose rate in response to the first signal and the distance result.

14. The method of claim 13, wherein the simulated source of contamination comprises simulated hazardous material.

15. The method of claim 13, wherein generating the first signal comprises generating data that simulates a response to a dose rate or contamination level of the source of contamination when the simulated detector is in contact with a surface.

16. The method of claim 13, wherein generating the second signal comprises generating data that simulates a dose rate or contamination level of the source of contamination adjusted according to the distance result.

17. The method of claim 16, wherein the simulated dose rate or contamination level simulates a maximum dose rate or contamination level at a contaminated surface, and wherein the processing unit generates the second signal that simulates a response to an adjusted dose rate or contamination level based on the distance result.

18. The method of claim 13 further comprising determining whether the simulated detector is properly positioned over the surface.

19. A method of training an operator to detect contamination in a hazardous environment comprising:
   setting at least one simulated measurement of the detected surface contamination on a control unit;
   transmitting the at least one simulated measurement to a simulated detector;
   measuring a distance and geometry with respect to a surface between a simulated detector and the surface over which the simulated detector is positioned by outputting a distance determination signal towards the surface and receiving a reflected distance determination signal from the surface;
   modifying the at least one simulated measurement in response to the reflected distance determination signal; and
   outputting the at least one modified simulation measurement to a display.

20. The method of claim 19, wherein the at least one simulated measurement comprises at least one of a simulated dose rate and a contamination level of at least one hazardous material.

21. The method of claim 19, wherein the display is at least one of a display of the control unit and a meter display.

22. The method of claim 19, wherein an instructor sets the at least one simulated measurement on the control unit and wherein the trainee has an instrument that receives the modified simulated measurement.

* * * * *